Figure 1:
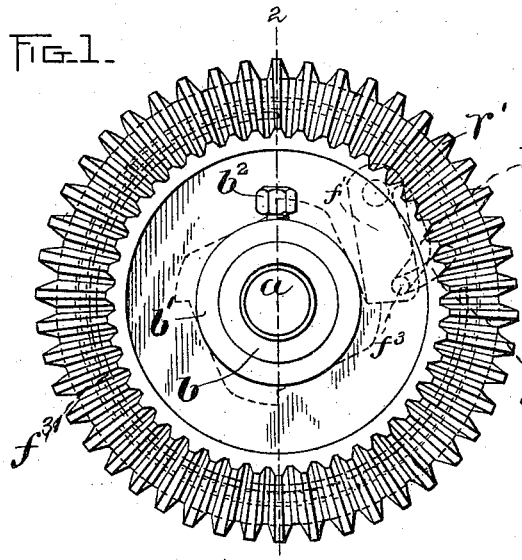

(No Model.)

J. F. GEB.
FEEDER FOR CARDING ENGINES.

No. 577,247. Patented Feb. 16, 1897.

WITNESSES:
A. D. Harrison.
P. W. Pizzetti.

INVENTOR:
Jacob F. Geb
by Wright Brown & Quinby
attys.

United States Patent Office.

JACOB F. GEB, OF FRANKLIN, MASSACHUSETTS, ASSIGNOR TO THE GEB ATTACHMENT COMPANY, OF SAME PLACE.

FEEDER FOR CARDING-ENGINES.

SPECIFICATION forming part of Letters Patent No. 577,247, dated February 16, 1897.

Application filed May 19, 1896. Serial No. 592,183. (No model.)

*To all whom it may concern:*

Be it known that I, JACOB F. GEB, of Franklin, in the county of Norfolk and State of Massachusetts, have invented certain new and useful Improvements in Feeders for Carding-Engines, of which the following is a specification.

This invention relates to a new and improved feeder for carding-engines; and it consists in the novel features of construction and relative arrangement of parts hereinafter fully described in the specification, clearly illustrated in the drawings, and particularly pointed out in the claim.

Reference is to be had to the accompanying drawings, forming a part of this specification, in which like characters are used to indicate like parts wherever they occur.

Figure 2:
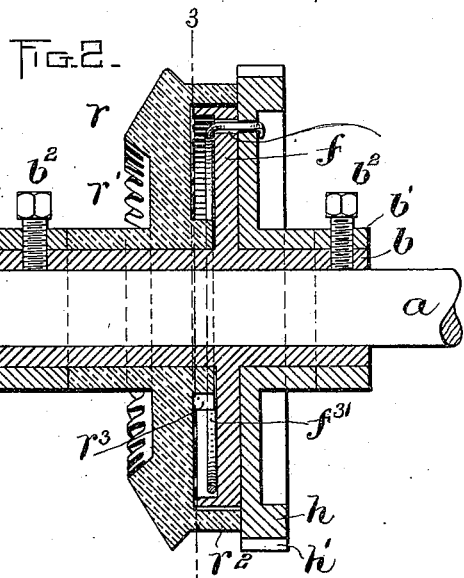
Figure 3:
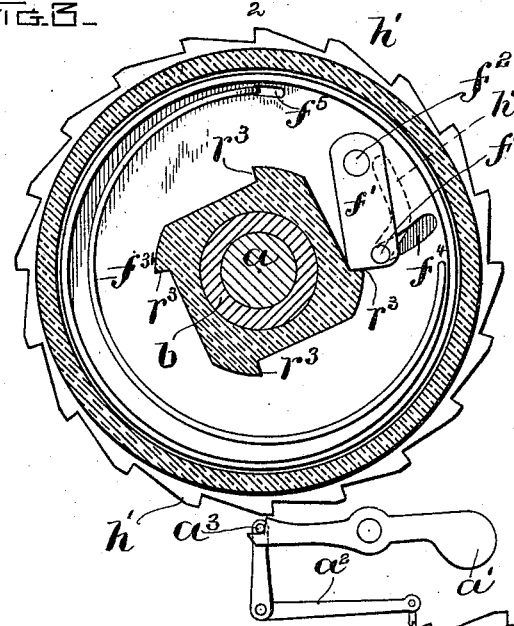
Figure 4:
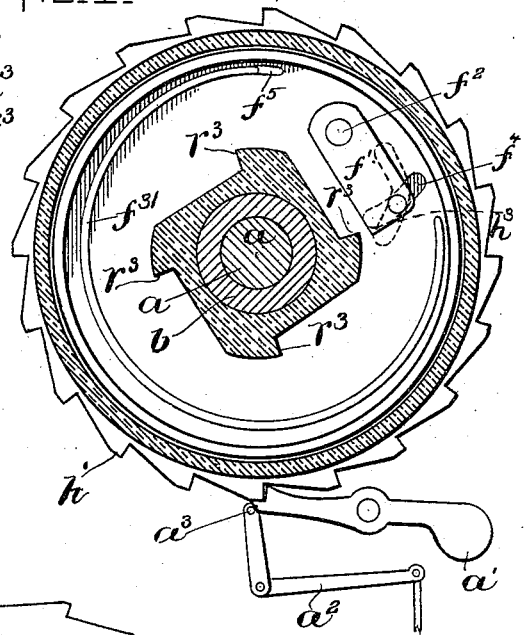
Figure 5:
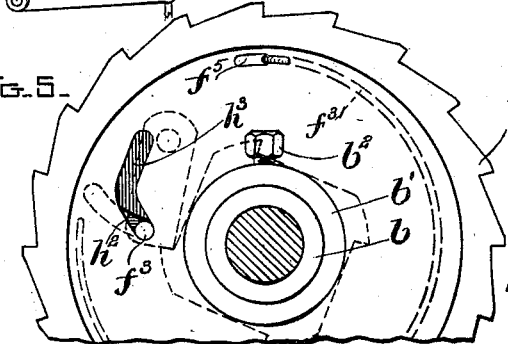

Figure 1 represents an end elevation of my improved mechanism. Fig. 2 represents a longitudinal sectional view thereof on the line 2 2 of Fig. 1. Fig. 3 represents a cross-sectional view thereof on the line 3 3 of Fig. 2. Fig. 4 represents a view similar to Fig. 3, showing the dog released from the flange of the gear. Fig. 5 represents a detail elevation from the right of Fig. 2.

This invention, while it may be employed in any desired connection, is especially designed to be used in connection with the Bramwell feed and is designed to provide a clutch which can be operated by a slight movement of the clutch-controlling collar, it being possible in the construction herein shown to perform this operation by a movement of the collar corresponding to a fraction of the distance of one tooth on said collar.

Referring to the drawings, in the embodiment of my invention therein shown and selected by me for the purpose of illustrating my invention $a$ represents a portion of the shaft which is used to drive the toothed apron of the Bramwell feeder, the latter not being shown, as it is of well-known construction.

The weighted dog $a'$ and the lever mechanism $a^2$ for operating said dog may be and preferably are of the form of construction shown in a patent granted to me February 16, 1892, No. 469,206, and a detailed description of these parts is not necessary, it being understood that the lever mechanism $a^2$ is connected with the scale-pan of the Bramwell feeder, so as to remove the dog from engagement with the teeth of the clutch-collar when the scale-pan returns to its normal position after dumping its load.

$a^3$ represents a pin on the lever mechanism engaging the dog, enabling it to be pulled away from the clutch-collar by the movement of the scale-pan as the scale-pan resumes its normal position in the collar by gravity.

$b$ represents a sleeve arranged on the shaft $a$. $b'$ represents collars arranged on either end of said sleeve. $b^2$ represents set-screws passing through said collars and sleeve and rigidly securing the sleeve to the shaft.

$f$ represents a disk secured to or integral with the sleeve $b$. $f'$ represents a dog pivoted by a pin $f^2$ near the periphery of said disk, said dog being provided with a stud $f^3$.

$h$ represents a ratchet-disk or clutch-controlling collar loosely mounted on the sleeve $b$, between the collar $b'$ and the disk $f$. This clutch-controlling disk or collar $h$ is formed upon its periphery with ratchet-teeth $h'$, adapted for engagement with the weighted dog $a'$.

$h^2$ represents a slot in the disk $h$, in which is arranged the stud $f^3$ of the disk $f$. This slot is arranged at an abrupt angle, so that the free end of the dog will be quickly oscillated by a very slight relative movement of the disks $f$ and $h$. An extension $h^3$ of the slot $h^2$, that is substantially concentric with the shaft $a$, permits a further relative movement with little, if any, oscillation of the dog, the stud $f^3$ of which also extends through a slot $f^4$ in the disk $f$ in passing to the slot $h^2 h^3$ of the disk $h$.

$r$ represents a continuously-driven member loosely arranged on the sleeve $b$ between the collar $b'$ and the side of the disk $f$ opposite that occupied by the disk $h$. The member $r$ is here shown as a gear having the usual teeth $r'$. This gear is continuously rotated, as in my former patent, by power communicated from the driving-shaft. (Not shown.) The member $r$ is formed with an annular flange $r^2$, which is arranged over the disk $f$ and its dog $f'$, the latter being between the member $r$ and the disk $f$.

$r^3$ represents stops projecting from the hub of the member $r$ adjacent to the disk $f$, said stops being adapted to be engaged by the free end of the dog $f'$ when said dog is moved inward, as hereinafter described, in order to lock the dog and member together.

$f^{31}$ represents a spring, here shown as a piece of wire connected at one end to the disk $j$ and at its other end passing through a slot $f^5$ in disk $f$ and fastened to the disk $h$ in such a way as to be under tension when the ratchet-disk is engaged and held by the weighted dog $a'$, so that when the weighted dog is removed from engagement with the teeth $h'$ by the return of the scale-pan to its normal position, as will be readily understood, the clutch-controlling collar or disk $h$ will be caused to rotate a short distance in a direction opposite to that of the travel of the hands of a watch, shown in Fig. 1, thus causing the stud $f^3$ to travel in the slot $h^2$ and bringing the free end of the dog $f'$ in the path of one of the stops $r^3$, in which position the member $r$ becomes the driving member, its motion being communicated to the disk and the shaft $a'$, which will continue until the scale-pan is loaded and tilts, when the dog $a'$ will be released from the lever mechanism $a^2$ and engage one of the ratchet-teeth $h'$. This engagement of the dog $a'$ with the ratchet-teeth $h'$ will hold the disk or collar $h$ stationary, causing the stud $f^3$ to travel out in the slot $h^2$, drawing the free end of the dog $f'$ from its engagement with the stop $r^3$, thus permitting the member $r$ to continue its rotation without affecting the shaft $a$. When, however, the scale-pan returns to its normal position after dumping its load, the lever mechanism $a^2$ causes the pin $a^3$ to engage the dog $a'$ to withdraw the latter from engagement with the tooth $h'$, thus permitting the spring $f^{31}$ to move the collar $h$ so as to throw the dog $f'$ into engagement with one of the stops $r^3$, thereby causing the shaft $a$ to rotate until the scale-pan is again loaded.

It is important in this class of machines that the feeding of the stock to the scale-pan, which is controlled by the movement of the shaft $a$, be stopped as soon as possible after the scale-pan has received its load.

As will be seen from the above construction, I am enabled to clutch and unclutch the dog $f'$ from the stop by a very slight movement of the collar $h$, the amount of movement depending upon the angle of the slot $h^2$, as will be readily understood; but since this amount of movement may be greater than sufficient to move the dog, as described, I provide the angular extension $h^3$ of the slot to permit this excess of movement after the dog has been withdrawn from the stop.

Having thus explained the nature of my invention and described a way of constructing and using the same, though without attempting to set forth all of the forms in which it may be made or all of the modes of its use, what I claim, and desire to secure by Letters Patent, is—

The combination of a shaft having affixed thereto a disk, a dog pivoted on one side of the latter, a driving member loosely mounted on said shaft and having a hub projecting into the plane of the dog, and constituting a clutch member for engagement with said dog, a ratchet-disk loosely mounted on the shaft, a cam-slot and pin connection between said ratchet-disk and the dog, a spring connecting the ratchet-disk and the dog-carrying disk, and means for arresting and releasing the ratchet-disk.

In testimony whereof I have signed my name to this specification, in the presence of two subscribing witnesses, this 15th day of May, A. D. 1896.

JACOB F. GEB.

Witnesses:
C. F. BROWN,
A. D. HARRISON.